(12) United States Patent
Kondo (10) Patent No.: US 7,565,163 B2
(45) Date of Patent: Jul. 21, 2009

(54) METHOD OF MEASURING RECEIVE POWER OF CDMA MOBILE COMMUNICATION SYSTEM, AND CDMA MOBILE COMMUNICATION SYSTEM

(75) Inventor: Takayuki Kondo, Tokyo (JP)

(73) Assignee: NEC Corporation, Tokyo (JP)

(*) Notice: Subject to any disclaimer, the term of this patent is extended or adjusted under 35 U.S.C. 154(b) by 556 days.

(21) Appl. No.: 11/401,951

(22) Filed: Apr. 12, 2006

(65) Prior Publication Data

US 2006/0234753 A1 Oct. 19, 2006

(30) Foreign Application Priority Data

Apr. 14, 2005 (JP) ............... 2005-116689

(51) Int. Cl.
*H04B 7/00* (2006.01)
(52) U.S. Cl. .............. 455/522; 455/69; 455/70; 455/67.11; 370/335
(58) Field of Classification Search ......... 455/522, 455/127.1, 69, 445, 63.1, 65, 67.11, 67.13, 455/78, 565, 509, 561, 70; 370/229, 389, 370/503, 329, 252, 474, 318, 338, 335; 342/359, 342/352

See application file for complete search history.

(56) References Cited

U.S. PATENT DOCUMENTS 6,895,245 B2 * 5/2005 Wallentin ............ 455/436
2003/0109274 A1 * 6/2003 Budka et al. ............ 455/522
2005/0047384 A1 * 3/2005 Wax et al. ............ 370/338
2006/0160550 A1 * 7/2006 Edwards ............ 455/509

FOREIGN PATENT DOCUMENTS

| JP | 2000-175256 | 6/2000 |
|---|---|---|
| JP | 2004-215276 | 7/2004 |

* cited by examiner

*Primary Examiner*—Tan Trinh
(74) *Attorney, Agent, or Firm*—Whitham, Curtis, Christofferson & Cook, P.C.

(57) ABSTRACT

The receive power of uplink signals in a CDMA mobile communication system is measured by prohibiting a mobile station from transmitting an uplink signal including a frame over a first channel during a predetermined transmission prohibition period, and measuring a receive power of uplink signals at a base station transmitted from each of the mobile stations located in a cell during the prohibition period. Another method of measuring the receive power includes measuring a first receive power of uplink signals at a base station from each mobile station located in a cell, and measuring each second receive power of uplink signal including a frame only over a first channel transmitted from each mobile station, and then calculating a total receive power of uplink signals excluding frames over the first channel by subtracting respective second receive powers from the first receive power.

8 Claims, 11 Drawing Sheets

METHOD OF MEASURING RECEIVE POWER OF CDMA MOBILE COMMUNICATION SYSTEM, AND CDMA MOBILE COMMUNICATION SYSTEM

BACKGROUND OF THE INVENTION

1. Field of the Invention

The present invention relates to a method of measuring a receive power of a CDMA mobile communication system, and in particular, to a method of obtaining a total receive power of uplink frames that are not transmitted over a predetermined channel such as a dedicated channel at a base station, and to a CDMA mobile communication system adopting the method.

2. Description of the Related Art

Figure 11:
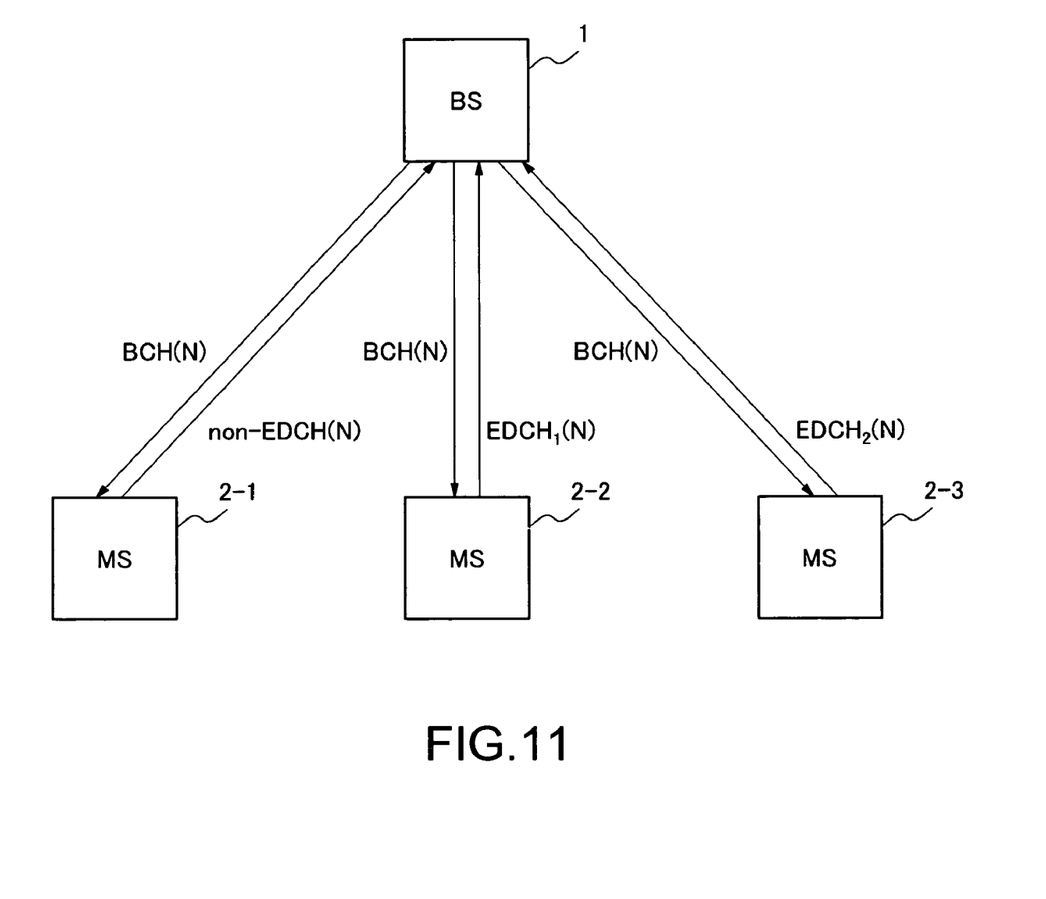
FIG. 11 is a block diagram showing a configuration of a conventional CDMA mobile communication system.
Figure 12:
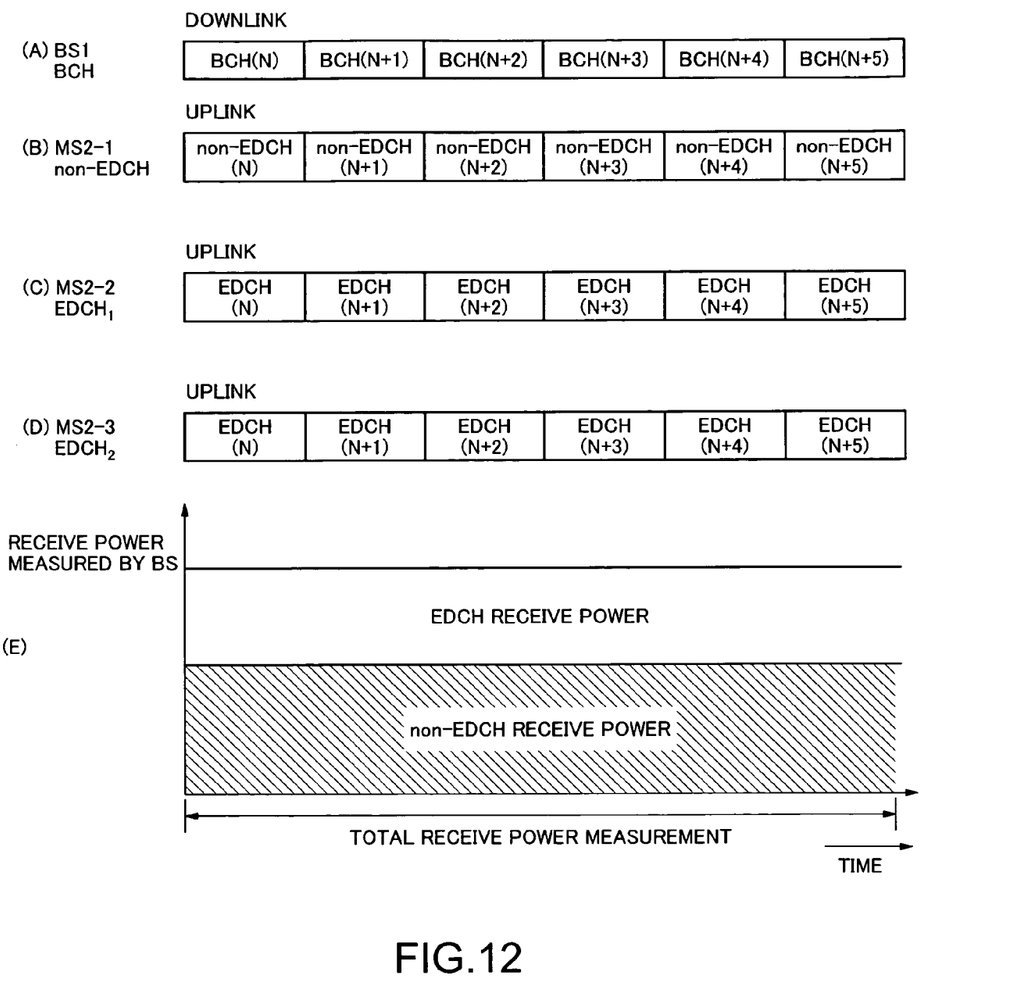
FIG. 12 is a timing chart showing an operation of the conventional CDMA mobile communication system.

A conventional method of measuring a receive power in a code division multiple access (hereinafter, referred to as "CDMA") mobile communication system will be described with reference to FIGS. 11 and 12. The conventional method of measuring a receive power is disclosed in, for example, Japanese Patent Application Laid-open No. 2004-215276A and JP 2000-175256 A. FIG., 11 is a block diagram showing a configuration of the conventional CDMA mobile communication system, and FIG. 12 is a timing chart showing an operation of the conventional CDMA mobile communication system. Part "A" of FIG. 12 is indicated in "FIG. 12-(A)", and such representation is used in the following FIGS.

A base station (hereinafter, referred to as "BS") 1 transmits downlink frames, BCH(N), BCH(N+1), BCH(N+2), ..., over a broadcast channel (hereinafter, referred to as "BCH") Herein, N is a natural number, and BCH (N) represents an Nth frame transmitted over a BCH. Mobile stations (hereinafter, mobile station is referred to as "MS") 2-1 to 2-3 are placed at positions sufficiently close to one another with respect to the transmission speed of radio waves, so they receive BCH(N), BCH(N+1), BCH(N+2), ... substantially concurrently.

Among MSs that have received downlink frames BCH(N), BCH(N+1), BCH(N+2), ..., transmitted over a BCH, MS 2-1 transmits uplink frames (hereinafter, referred to "non-EDCH"), non-EDCH(N), non-EDCH(N+1), non-EDCH(N+2), ... over one or more channels, but not over an enhanced dedicated channel (hereinafter, referred to as "EDCH" (FIG. 12-(B)) Herein, N is a natural number, and non-EDCH(N) represents an Nth frame transmitted over a non-EDCH. The BS 1 receives the non-EDCH(N), non-EDCH(N+1), non-EDCH(N+2), .... The EDCH is, for example, a kind of a dedicated channel for providing a high data rate of an uplink, a standardization of which is being studied in a 3rd generation partnership project (3GPP)

Furthermore, the MS 2-2 that has received BCH(N), BCH (N+1), BCH(N+2), ... transmits uplink frames, $EDCH_1(N)$, $EDCH_1(N+1)$, $EDCH_1(N+2)$, ... transmitted over an EDCH (FIG. 12-(C)). Herein, N is a natural number, and $EDCH_1(N)$ represents an Nth frame transmitted over an EDCH. A subscript "1" represents a frame transmitted by MS 2-2. BS 1 receives the $EDCH_1(N)$, $EDCH_,(N+1)$, $EDCH_1(N+2)$, ....

Similarly, the MS 2-3 that has received BCH(N), BCH(N+1), BCH(N+2), ... transmits uplink frames, $EDCH_2(N)$, $EDCH_2(N+1)$, $EDCH_2(N+2)$, ... transmitted over an EDCH (FIG. 12-(D)). Herein, N is a natural number, and $EDCH_2(N)$ represents an Nth frame transmitted over an EDCH. A subscript "2" represents a frame transmitted by MS 2-3. BS 1 receives the $EDCH_2(N)$, $EDCH_2(N+1)$, $EDCH_2(N+2)$, ....

Then, BS 1 obtains a total of the receive powers of three uplink frames of the non-EDCH, $EDCH_1$, and $EDCH_2$ respectively from MSs 2-1 to 2-3.

At this time, as shown in FIG. 12-(E), the receive power obtained by BS 1 is a total of the receive power of the non-EDCH and the total of the receive powers of the $EDCH_1$ and uplink $EDCH_2$. That is, BS 1 cannot obtain the total of the receive power only of the non-EDCH, which is not transmitted over EDCHs.

As examples of techniques for maintaining communication quality, there are an admission control and a congestion control. Herein, the admission control is a control of limiting making connections over a network so as to keep a quality of service of an existing connection in a case where a network traffic of a radio line reaches a saturation point of the network capacity. Furthermore, the congestion control is a control of decreasing a communication rate mainly of an existing connection of a packet user and changing a channel from a dedicated channel to a common channel so as to keep a quality of the existing connection in a case where the network traffic of a radio line reaches a saturation point of the network capacity.

In the CDMA mobile communication system, in order to perform the admission control and the congestion control of uplink non-EDCHs, it is necessary to use the total receive power of the non-EDCH frames, frames transmitted not over EDCHs that are dedicated channels, from each MSs.

However, as described above, according to the conventional method of measuring a receive power, a total receive power of non-EDCHs cannot be measured. Thus, there arises a problem in that the admission control and the congestion control using the total receive power of non-EDCHs cannot be performed.

SUMMARY OF THE INVENTION

The present invention was made to solve the foregoing and other exemplary problems, drawbacks, and disadvantages of the conventional structures.

In view of the problems, drawbacks, and disadvantages, an exemplary feature of the present invention is to provide a method of measuring a receive power of a CDMA mobile communication system in which it is possible to measure a total receive power of frames from MSs on a radio line transmitted not over a predetermined channel such as a dedicated channel.

According to one embodiment, a transmission prohibition period of a frame over a first channel (e.g. an EDCH) is set with respect to a BS and MSs in the radio cell (coverage) of the BS. Therefore, during the transmission prohibition period, the total receive power of frames from the MSs on the uplink radio line, transmitted not over the first channel, can be measured by the BS.

Thus, the BS can perform many types of controls using the total receive power of frames from MSs on an uplink radio line transmitted not over a predetermined channel such as a dedicated channel. For example, the BS can perform an admission control and a congestion control using the total of the receive power.

According to another embodiment, a transmission prohibition period of an EDCH is not set with respect to BS and the MSs in the radio cell. Rather, in this embodiment the transmissions of non-$EDCH_2$ by the MSs is similar to conventional CDMA-systems; however, an EDCH respread unit is utilized in the BS to perform correlation demodulation by respreading the signal received into individual signal components in the cell of the BS. Then, a power calculation is performed based on the respective signal components separated by the EDCH respread unit.

BRIEF DESCRIPTION OF THE DRAWINGS

The above and other objects, features and advantages of the present invention will become more apparent form the following detailed description when taken in conjunction with the accompanying drawings wherein.

DETAILED DESCRIPTION OF THE EXEMPLARY EMBODIMENTS

1. First Exemplary Embodiment

Figure 1:
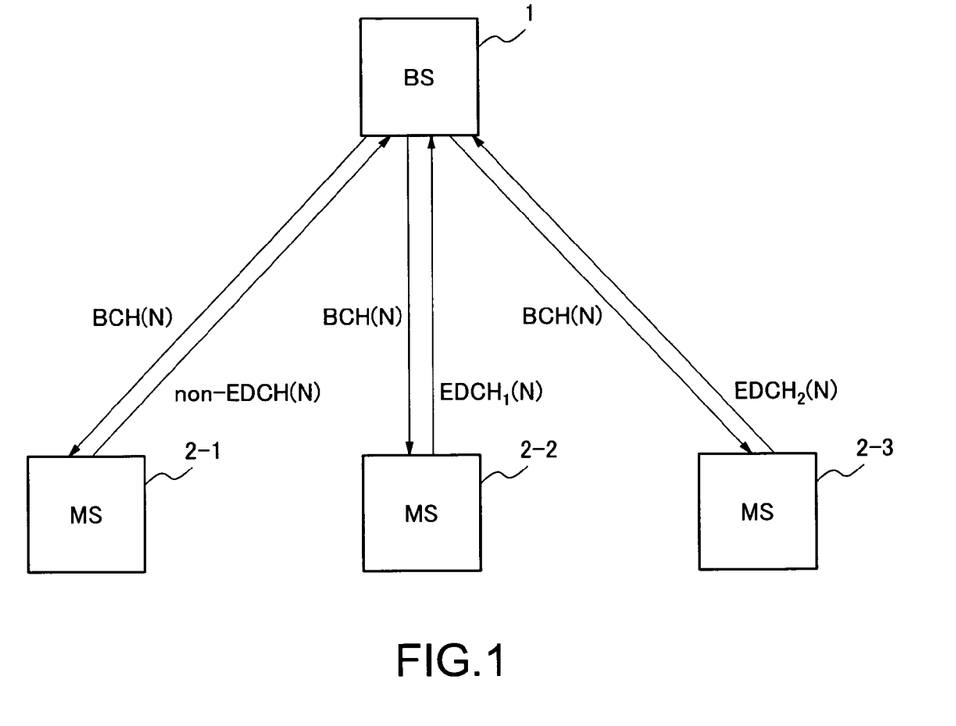
FIG. 1 is a block diagram showing a configuration of a CDMA mobile communication system of a first exemplary embodiment of the present invention.
Figure 2:
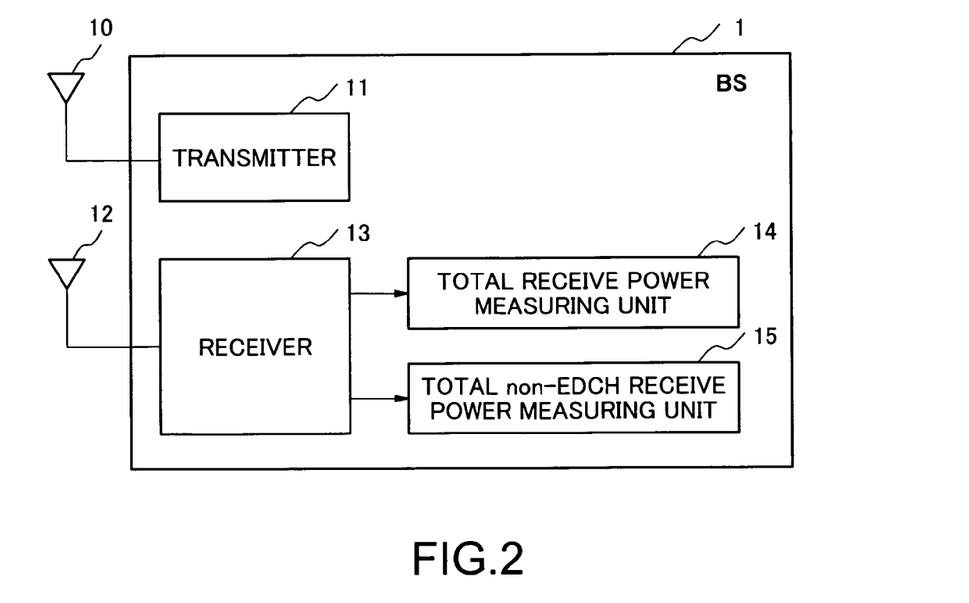
FIG. 2 is a block diagram showing one exemplary configuration of a BS in the CDMA mobile communication system of the first exemplary embodiment.
Figure 3:
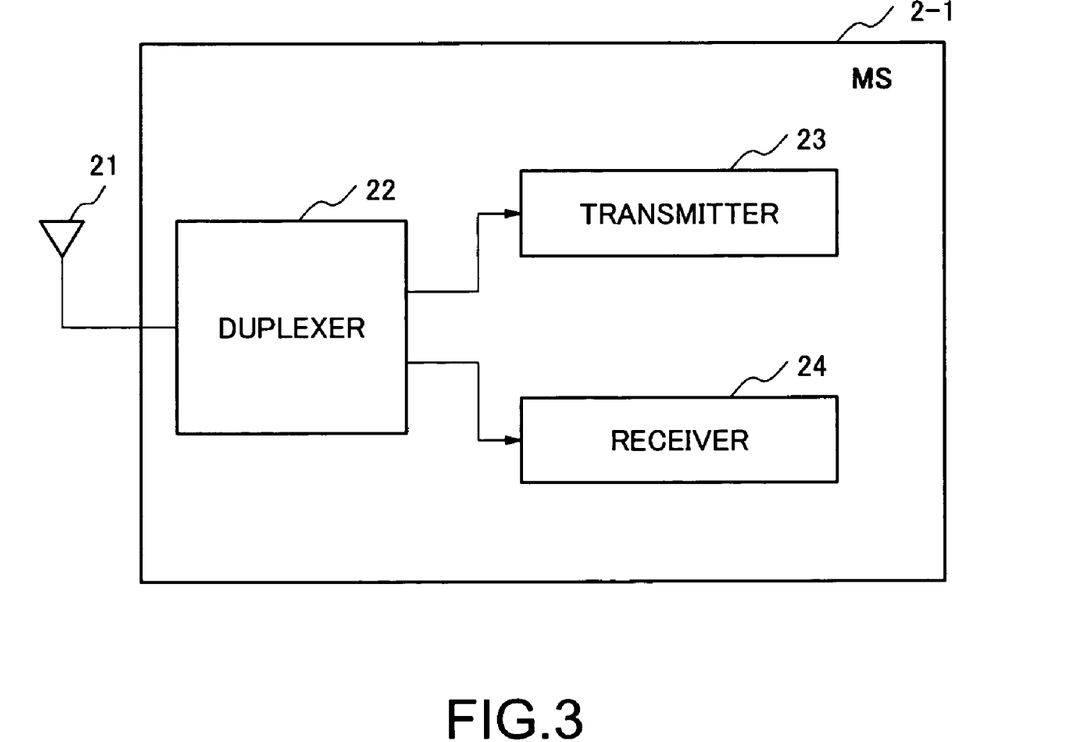
FIG. 3 is a block diagram showing one exemplary configuration of an MS in the CDMA mobile communication system of the first exemplary embodiment.
Figure 4:
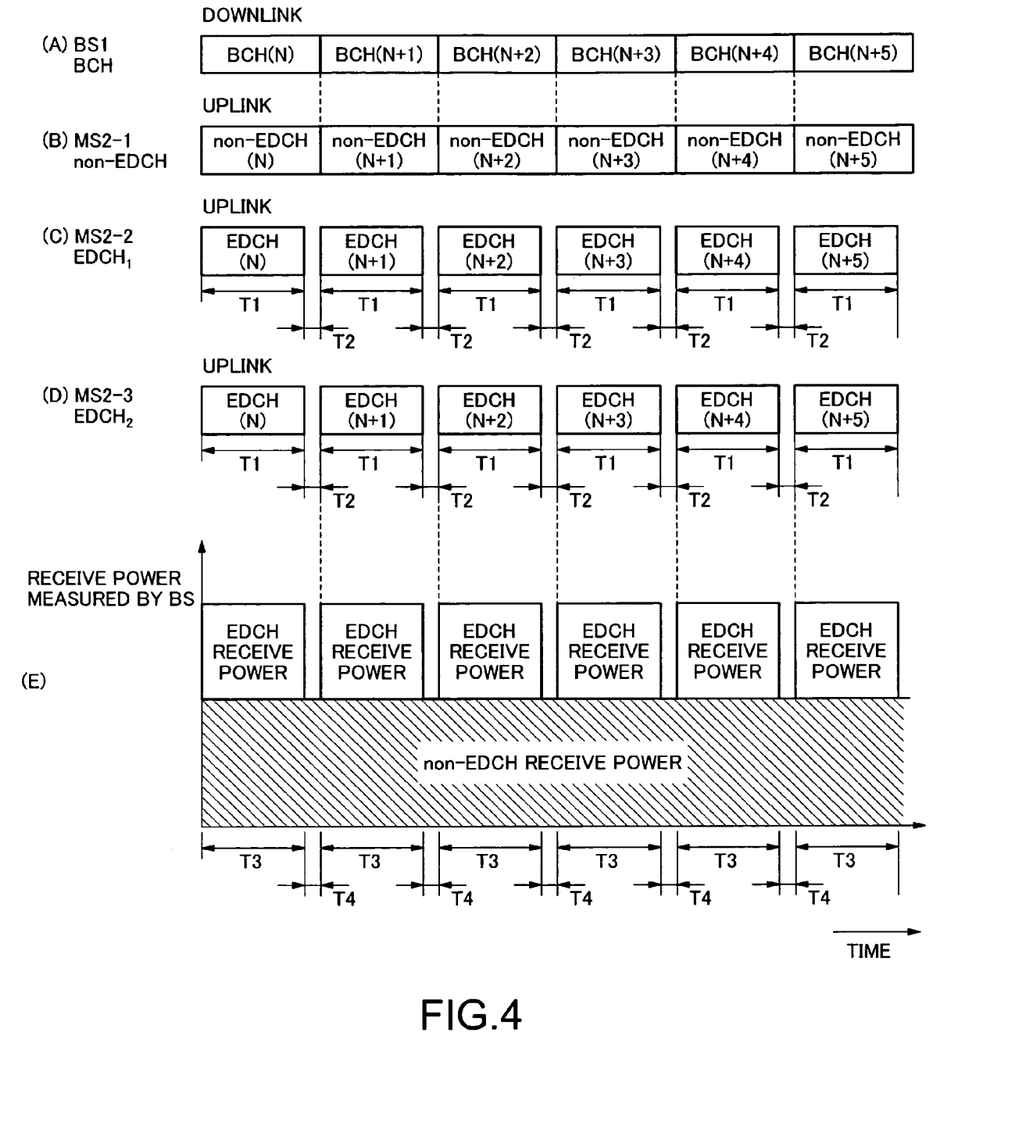
FIG. 4 is a timing chart showing an operation of the CDMA mobile communication system of the first exemplary embodiment.
Figure 5:
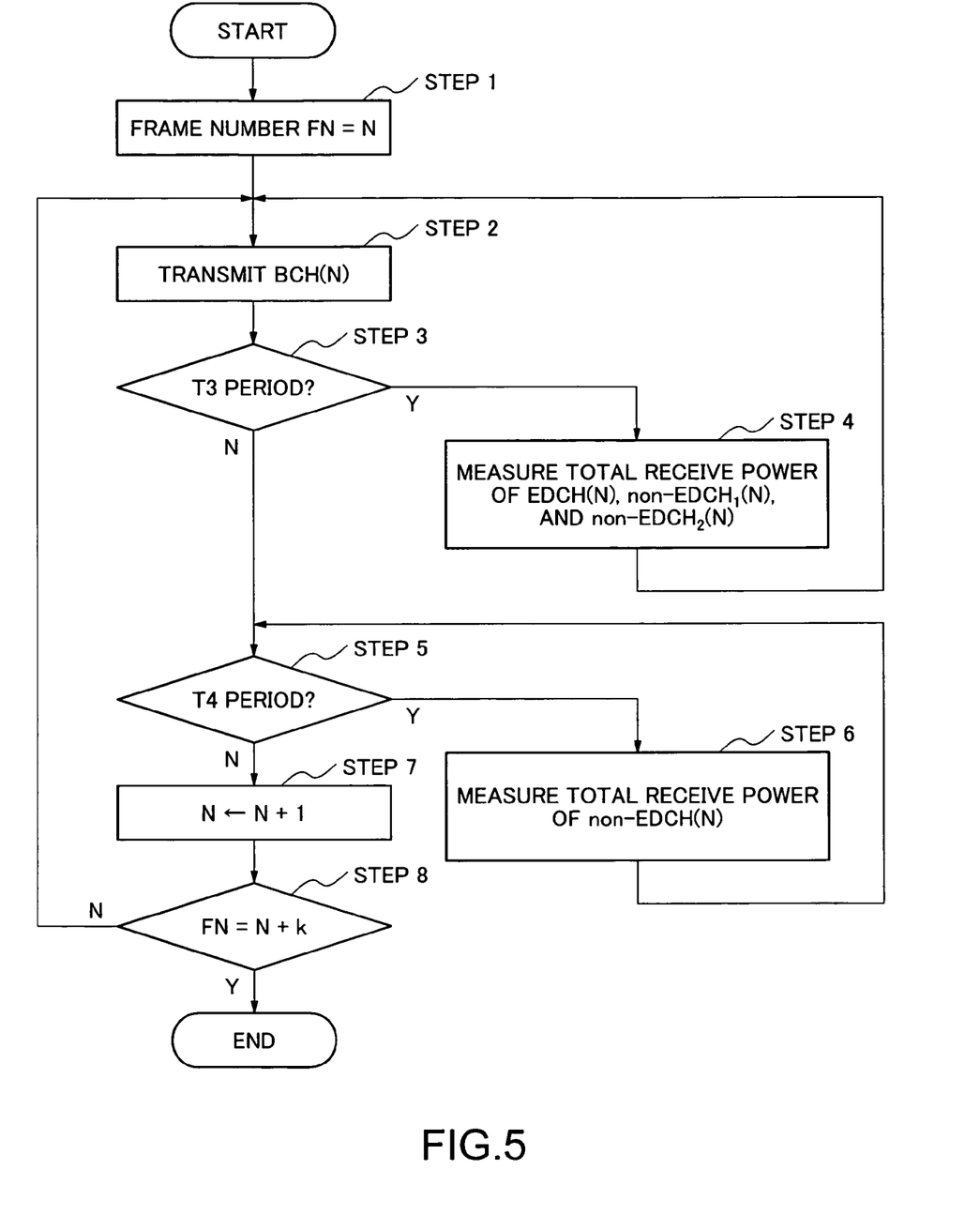
FIG. 5 is a flow chart showing an operation of a BS of the first exemplary embodiment.

Embodiments of the present invention will be described with reference to the drawings. FIG. 1 is a block diagram showing a configuration of a CDMA mobile communication system of a first exemplary embodiment of the present invention. FIG. 2 is a block diagram showing an exemplary configuration of a BS 1. FIG. 3 is a block diagram showing an exemplary configuration of MSs 2-1 to 2-3. FIG. 4 is a timing chart showing an operation of the CDMA mobile communication system of the first exemplary embodiment. FIG. 5 is a flow chart showing a receive power measurement operation of a BS of the CDMA mobile communication system of the first exemplary embodiment.

The BS 1 includes a transmitting antenna 10, a transmitter 11 for transmitting a signal to the MSs 2-1 to 2-3., a receiving antenna 12, and a receiver 13 for receiving a signal from MSs 2-1 to 2-3. Furthermore, BS 1 preferably includes two kinds of measuring parts for measuring receive powers of uplink frames received from MSs 2-1 to 2-3. One of the measuring parts is a total receive power measuring unit 14 for measuring receive powers of all the frames received from MSs 2-1 to 2-3 to obtain a total receive power. The other measuring part is a total non-EDCH receive power measuring unit 15 for measuring receive powers of uplink non-EDCH frames in from MSs 2-1 to 2-3 to obtain a total receive power.

The MS 2-1 includes a transmitting/receiving antenna 21, a duplexer 22 for-separating a signal transmitted from BS 1, from a signal transmitted to. BS 1, a transmitter 23 for transmitting a signal to BS 1, and a receiver 24 for receiving a signal from BS 1. MSs 2-2 and 2-3 have a configuration similar to that of MS 2-1.

Hereinafter, the operation of the CDMA mobile communication system of this embodiment will be described with reference to FIGS. 1 to 4. The transmitter 11 of BS 1 transmits frames BCH(N), BCH(N+1), BCH(N+2), . . . over a downlink broadcast channel BCH, as shown in FIG. 4(A). The receivers 24 of MSs 2-1 to 2-3 receive BCH(N), BCH(N+1), BCH(N+2), . . . substantially at the same time, as shown in FIGS. 4-(B) to 4-(D).

When receiver 24 receives frames BCH(N), BCH(N+1), BCH(N+2), . . . , the transmitter 23 of the MS 2-1 transmits uplink frames non-EDCH(N), non-EDCH(N+1), non-EDCH(N+2), . . . . This transmission is not made over a dedicated channel EDCH. Then, the receiver 13 of BS 1 receives non-EDCH(N), non-EDCH(N+1), non-EDCH(N+2), . . . .

On the other hand, when receiver 24 receives BCH(N), BCH(N+1), BCH(N+2), . . . , transmitter 23 of MS 2-2 transmits $EDCH_1(N)$, $EDCH_1(N+1)$, $EDCH_1(N+2)$, . . . during a predetermined transmission permit period (T1 in FIGS. 4-(A) to 4-(E)) of an EDCH. Then, receiver 13 of BS 1 receives the uplink EDCH.

Similarly, when receiver 24 receives BCH(N), BCH(N+1), BCH(N+2), . . . , transmitter 23 of MS 2-3 transmits $EDCH_2(N)$, $EDCH_2(N+1)$, $EDCH_2(N+2)$, . . . during the transmission permit period T1 of the EDCH. Then, receiver 13 of BS 1 receives $EDCH_2(N)$, $EDCH_2(N+1)$, $EDCH_2(N+2)$, . . . .

The transmission permit period T1 of the EDCH in MSs 2-1 to 2-3 refers to a period from a time when a frame transmitted over a downlink broadcast channel is received to a time when a predetermined time elapses. After the elapse of this predetermined time, a transmission prohibition period T2 is set, during which the transmission of a frame over an EDCH is prohibited until a subsequent frame transmitted over a BCH is received. During the T2 period, the transmission of a frame over an EDCH is prohibited.

A total receive power measuring unit 14 of BS 1 measures receive powers of the uplinks of MSs 2-1 to 2-3 to obtain a total receive power in a predetermined transmission permit period (T3 of FIGS. 4-(A) to 4-(E)) of an EDCH. Furthermore, the total non-EDCH receive power measuring unit 15 of BS 1 measures non-EDCH receive powers of the uplinks of MSs 2-1 to 2-3 to obtain a total receive power in a transmission prohibition period (T4 of FIGS. 4-(A) to 4-(E)) of an EDCH.

The transmission permit period T3 of an EDCH in BS 1 refers to a period from a time when a frame is transmitted over a downlink broadcast channel to a time when a predetermined time elapses. After the elapse of this predetermined time, a transmission prohibition period T4 of an EDCH is set, until a subsequent frame is transmitted over a downlink broadcast channel.

Next, using FIG. 5, the receive power measurement operation of BS 1 of the CDMA mobile communication system of this embodiment will be described in detail. First, BS 1 sets a frame number (FN) to N (N is an arbitrary integer) (Step 1), and starts transmitting BCH(N) (Step 2). Next, BS 1 confirms that the current period is the T3 period (Step 3), and measures the receive powers of all the frames from MSs as a total receive power during the T3 period (Step 4). The total receive power at this time is a total of receive powers of non-EDCH (N), $EDCH_1(N)$, and $EDCH_2(N)$.

Then, BS 1 confirms that the period has changed from the T3 period to the T4 period (Step 5), and measures the total receive power of all the frames from the MSs (Step 6). At this time, since $EDCH_1(N)$ and $EDCH_2(N)$ have not been transmitted, the measured total receive power is a total receive power of non-EDCH(N).

When the T4 period is finished, BS 1 adds 1 to the FN (Step 7), and repeats the operations from Step 1 to Step 7 until the FN becomes N+k (k is the number of frames transmitted by BS 1, and is an integer not smaller than 1) (Step 8).

As described above, in this embodiment, the transmission prohibition periods T2 and T4 of an EDCH are set with respect to BS 1 and MSs 2-1 to 2-3 in the radio cell of the BS. Then, in MSs 2-1 to 2-3, an uplink EDCH is not allowed to be transmitted during the transmission prohibition period T2, and in BS 1, a total receive power of an uplink non-EDCH of MSs 2-1 to 2-3 can be measured during T4.

As described above, in this embodiment, it is possible to measure the total receive power of non-EDCHs transmitted not over EDCHs that are on dedicated channels. Therefore, there is an effect that BS 1 can perform many types of controls using the measured total receive power level of a non-EDCH, for example an admission control and a congestion control of an uplink non-EDCH.

JP 2000-175256 A shows a mobile communication terminal which measures a signal-to-interference ratio (SIR) over an entirety or a part of communication channels. The mobile communication terminal measures the signal level of the signals transmitted by another mobile communication terminal over a channel. Here, the entirety or the part of the communication channels refer to an entirety or a part of all channels used by one communication terminal. The channels another mobile communication terminal can use aren't restricted. Nor are there transmission periods for which specific channels can be used restricted. The procedure of JP 2000-175256 A has an object of enhancing the measurement precision of a desired signal of a certain communication terminal. In contrast, this embodiment has an object of enhancing the measurement precision of an interference with respect to all the communication terminals, and is different from the configuration of JP 2000-175256 A.

2. Second Exemplary Embodiment

Figure 6:
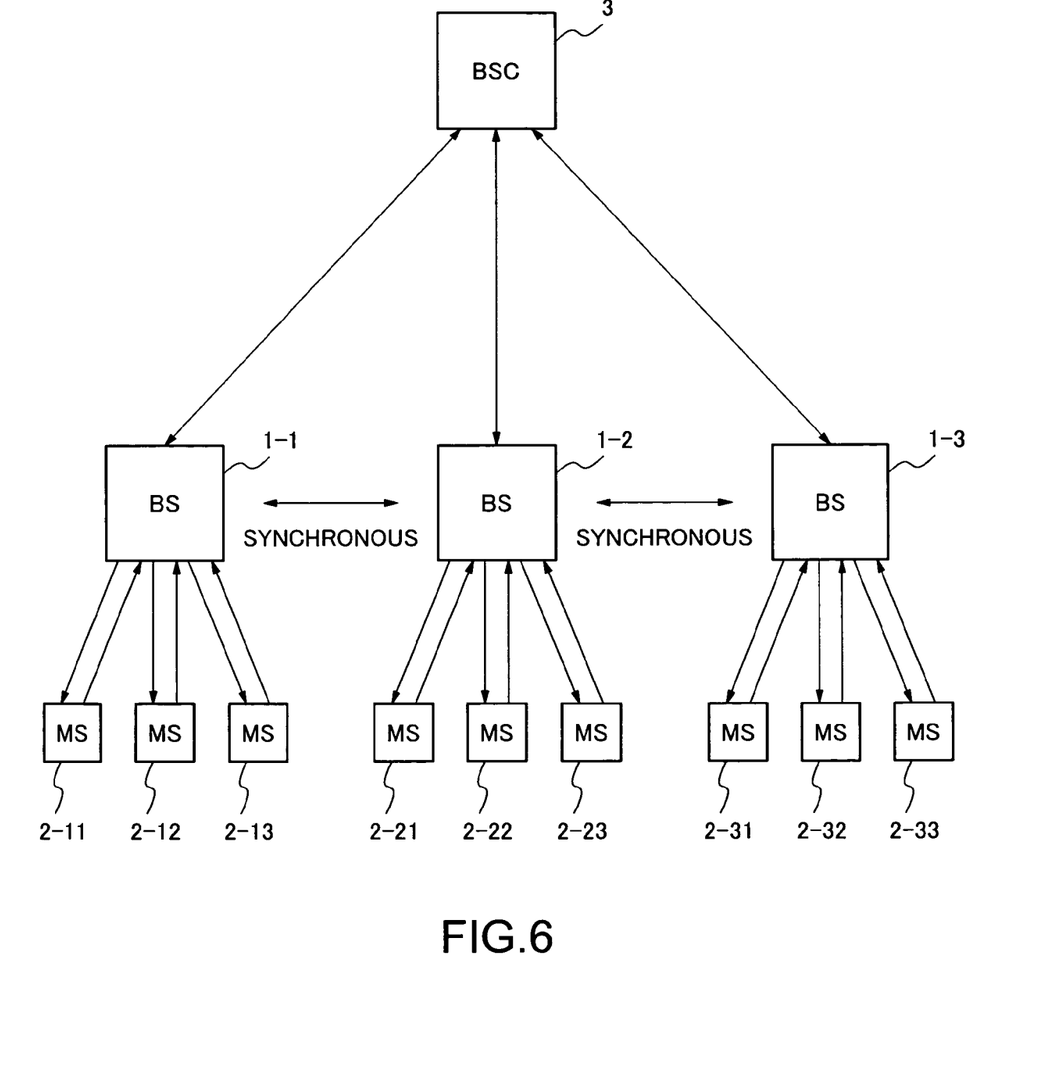
FIG. 6 is a block diagram showing a configuration of a CDMA mobile communication system according to a second exemplary embodiment of the present invention, in which each BS transmits a frame BCH(N) over a broadcast channel at a synchronous timing.

Next, a second exemplary embodiment of the present invention will be described. The configurations of a BS and an MS of the CDMA mobile communication system of this embodiment is the same as that of the first exemplary embodiment, so FIGS. 1 to 4, and 6 are referred to. In this embodiment, there are a plurality or set of BSs 1, and each BS 1 transmits a frame over a BCH at a synchronous and identical timing. FIG. 6 shows a configuration of the CDMA mobile communication system in which there are three BSs 1-1 to 1-3, and their frame transmission timings are synchronous. The BSs 1-1-to 1-3 are controlled by, for example, a base station controller (BSC) 3. An apparatus for controlling the BSs 1-1 to 1-3 may not be the BSC, and may be a radio network controller (RNC) or the like.

The transmission prohibition periods T2, T4 of each EDCH of the BSs 1-1 to 1-3 in the second exemplary embodiment are the identical timing.

In the same way as in the first exemplary embodiment, MSs 2-11 to 2-13 in the radio cell (coverage) of the BS 1-1 and MSs 2-21 to 2-23 in the radio cell of the BS 1-2 and MSs 2-31 to 2-33 in the radio cell of the BS 1-3 do not transmit an uplink EDCH during the transmission prohibition period T2 of an EDCH. Then, the BS 1-1 measures the total receive power of an uplink non-EDCH of the MSs 2-11 to 2-13 during T4 of an EDCH. The BS 2-1 measures the total receive power of an uplink non-EDCH of the MSs 2-21 to 2-23 during the transmission prohibition period T4. Then, the BS 3-1 measures the total receive power of an uplink non-EDCH of the MSs 2-31 to 2-33 during T4.

As described above, in this embodiment, the transmission prohibition period of an EDCH is the identical timing in the BS 1-1, BS 2-1, and BS 3-1. Thus, the same effect as that of the first exemplary embodiment is exhibited, and during the measurement of a total non-EDCH receive power of each BS, an EDCH interference from the other BSs can be removed. Therefore, there is an effect that the measurement precision of the total non-EDCH receive power can be enhanced.

3. Third Exemplary Embodiment

Figure 7:
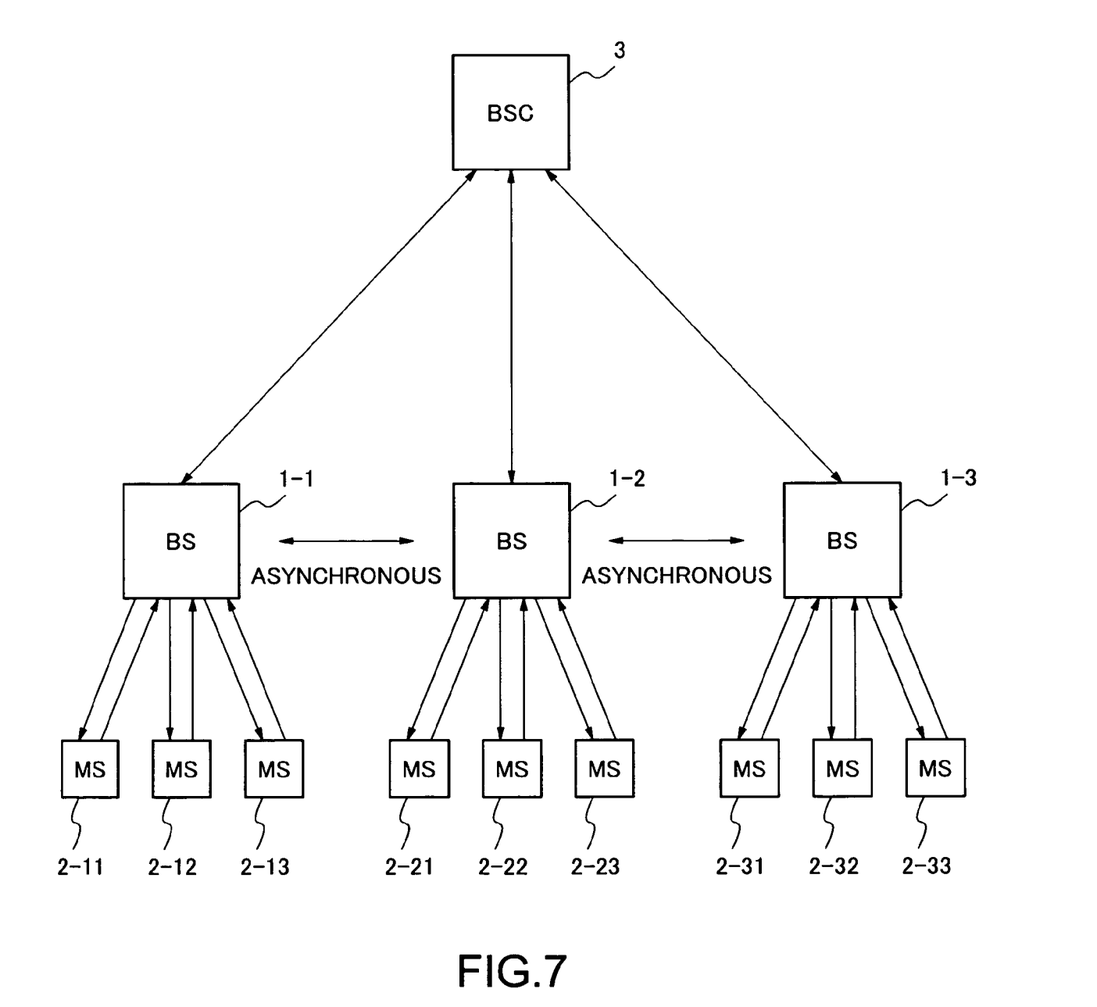
FIG. 7 is a block diagram showing a configuration of a CDMA mobile communication system according to a third exemplary embodiment of the present invention, in which each BS transmits BCH(N) at asynchronous timings.

Next, a third exemplary embodiment of the present invention will be described. The configurations of a BS and an MS of the. CDMA mobile communication system of this embodiment is the same as that of the first exemplary embodiment, so FIGS. 1 to 4, and 7 are referred to. In this embodiment, there are a plurality or set of BSs, and each BS transmits a frame over a BCH at an asynchronous or different timing from one another. FIG. 7 shows a configuration of the CDMA mobile communication system in which there are three BSs 1-1 to 1-3, and their frame transmission timings are asynchronous, that is, the BSs transmit frames at timings different from one another. The BSs 1-1 to 1-3 are controlled by, for example, a BSC 3. An apparatus for controlling the BSs 1-1 to 1-3 may not be the BSC, and may be an RNC or the like.

At least one of the transmission prohibition periods T2 and T4 of each EDCH of the BSs 1-1 to 1-3 in the third exemplary embodiment is different from the others.

In the same way as in the first exemplary embodiment, MSs 2-11 to 2-13 in the radio cell of the BS 1-1 and MSs 2-21 to 2-23 in the radio cell of the BS 1-2 and MSs 2-31 to 2-33 in the radio cell of the BS 1-3 do not transmit an, uplink EDCH during T2. Then, the BS 1-1 measures the total receive power of an uplink non-EDCH of the MSs 2-11 to MS 2-13 during T4 of an EDCH. The BS 2-1 measures the total receive power of an uplink non-EDCH of the MSs 2-21 to 2-23 during T4. Then, the BS 3-1 measures the total receive power of an uplink non-EDCH of the MSs 2-31 to 2-33 during T4.

As described above, in this embodiment, the BS 1-1, BS 2-1, and BS 3-1 each have the different transmission prohibition period of an EDCH. Therefore, there is the same effect as that of the first exemplary embodiment. And the interference change amount, which is given by the BS 1 to another BS 1, can be averaged. Accordingly, there is an effect that the quality degradation of an uplink of each BS 1 is averaged and it is suppressed.

4. Fourth Exemplary Embodiment

Figure 8:
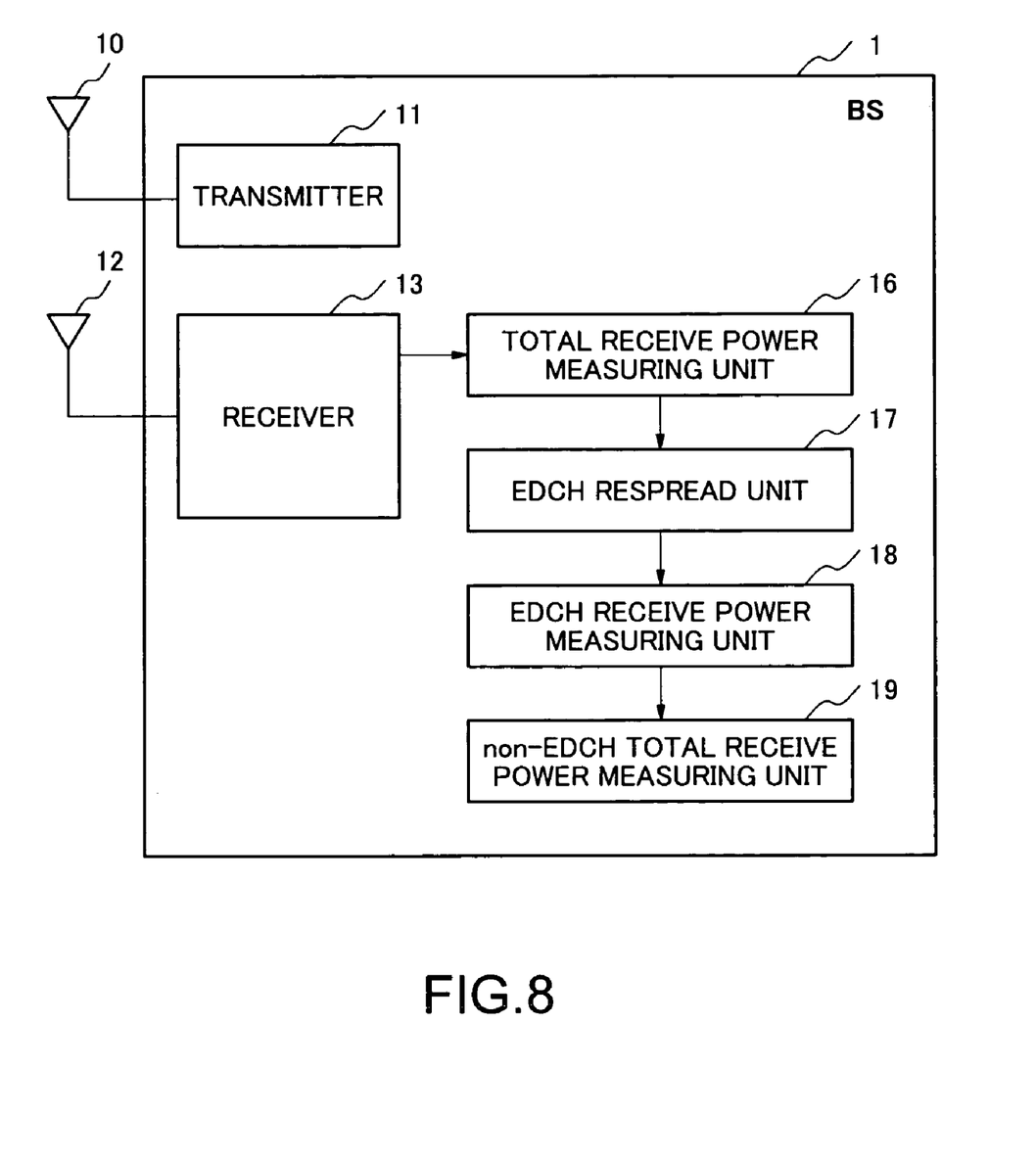
FIG. 8 is a block diagram showing one exemplary configuration of a BS in a CDMA mobile communication system according to a fourth exemplary embodiment of the present invention.
Figure 9:
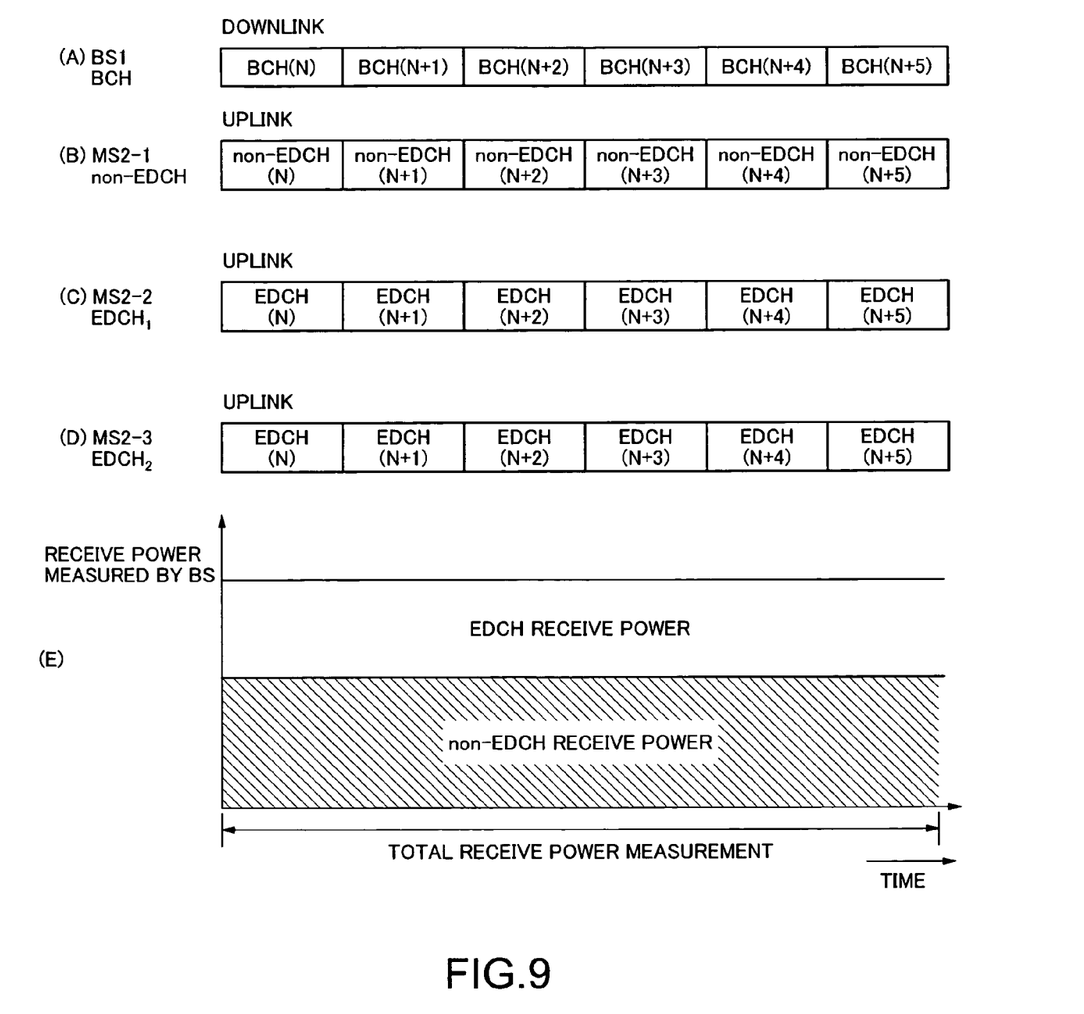
FIG. 9 is a timing chart showing an operation of the CDMA mobile communication system of the fourth exemplary embodiment.
Figure 10:
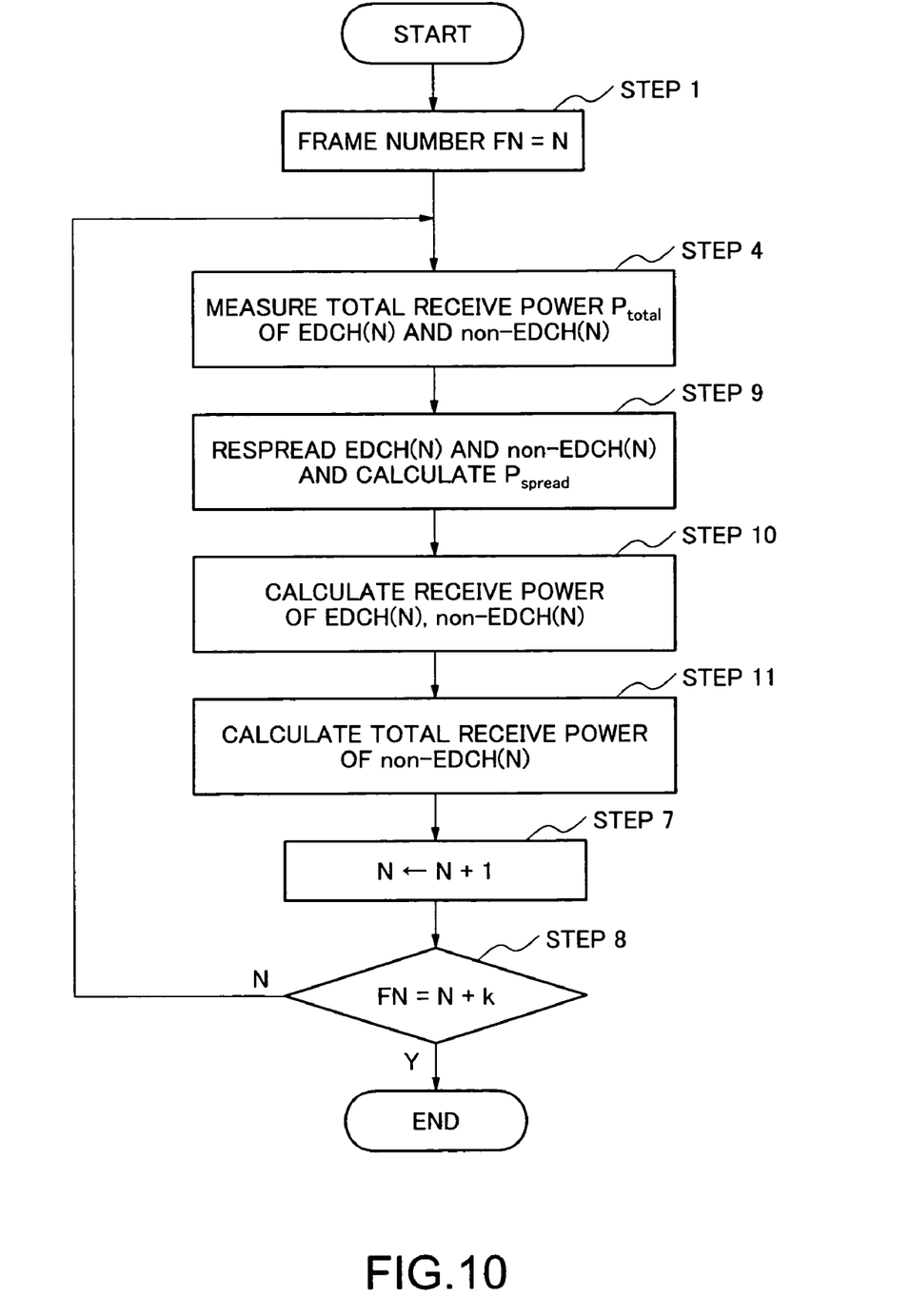
FIG. 10 is a flow chart showing an operation of a BS of the fourth exemplary embodiment.

Next, a fourth exemplary embodiment of the present invention will be described. The entire configuration of the CDMA mobile communication system and the configuration of an MS in this embodiment are the same as those in the first exemplary embodiment. Therefore, the fourth exemplary embodiment will be described with reference to FIGS. 1, 2, and 3. FIG. 8 is a block diagram showing one exemplary configuration of the BS 1 of this embodiment, and the same components as those in FIG. 2 are denoted with the same reference numerals. FIGS. 9-(a) to 9-(E) are a timing chart showing an operation of the CDMA mobile communication system of the fourth exemplary embodiment. FIG. 10 is a flow chart showing a receive power measurement operation of a BS of the CDMA mobile communication system of the fourth exemplary embodiment.

The BS 1 shown in FIG. 8 includes a transmitting antenna 10, a transmitter 11, a receiving antenna 12, a receiver 13, a total receive power measuring unit 16, an EDCH respread unit 17, an EDCH receive power calculating unit 18, and a total non-EDCH receive power calculating unit 19.

In this embodiment, unlike the-first to third exemplary embodiments, a transmission prohibition period of an EDCH is not set with respect to the BS 1, and the MSs 2-1 to 2-3 in the radio cell of the BS. Thus, the transmission of BCH(N) by the BS 1, the transmission of EDCH(N) by the MS 2-1, the transmission of non-EDCH$_1$(N) by the MS 2-2, and the transmission of non-EDCH$_2$(N) by the MS 2-3 are similar to those of the conventional CDMA mobile communication system. More specifically, FIGS. 9-(A) to 9-(D) each show timings at which the BS 1, MSs 2-1 to 2-3 transmit frames, respectively.

The total receive power measuring unit 16 measures the total receive power of uplink frames of the MSs 2-1 to 2-3. The total receive power at this time is a total of receive powers of non-EDCH(N), EDCH$_1$(N), and EDCH$_2$(N). In this embodiment, the EDCH respread unit 17 and the EDCH receive power calculating unit 18 calculate each EDCH receive power of the MSs 2-1 to 2-3 in the radio cell of the BS, using the transmit/receive power measured by the total receive power measuring unit 16. More specifically, the EDCH respread unit 17 performs correlation demodulation by respreading a signal received by the receiver 13, thereby separating the signal into individual signal components of the MSs 2-1 to 2-3 in the radio cell of the BS. Then, the EDCH receive power calculating unit 18 obtains a receive power after respreading, based on the respective signal components separated by the EDCH respread unit 17. Furthermore, the EDCH receive power calculating unit 18 obtains an EDCH receive power for each MS by dividing the receive power after respreading for each MS by a spreading factor (hereinafter, referred to as an "SF").

The total non-EDCH receive power calculating unit 19 obtains the total of an EDCH receive power for each MS calculated by the EDCH receive power calculating unit 18. Then, the total non-EDCH receive power calculating unit 19 subtracts the total of an EDCH receive power, from the total receive power-of an uplink measured by the total receive power measuring unit 16, thereby obtaining a total non-EDCH receive power of an uplink.

Assuming that the total receive power of an uplink is $P_{total}$, and the receive power for each MS after respreading is $P_{spread}$, the total non-EDCH receive power $P_{non}$ of an uplink is obtained by the following expression.

$$P_{non} = P_{total} - \Sigma(P_{spread}/SF) \quad (1)$$

$\Sigma(P_{spread}/SF)$ in Expression (1) means that the receive power $P_{spread}$ for each MS after respreading is divided by SF, and the results thus obtained are totaled.

Next, using FIG. 10, the receive power measurement operation of the BS 1 of the CDMA mobile communication system of this embodiment will be described in detail. First, the BS 1 sets a frame number (FN) at N (N is an arbitrary integer) (Step 1), and starts transmitting BCH (N) (Step 2). Next, the BS 1 measures the receive power of all the frames from MSs as a total receive power $P_{total}$ (Step 4). The total receive power at this time is a total of receive powers of n-EDCH(N), EDCH$_1$(N), and EDCH$_2$(N).

Then, the BS 1 respreads the received signals of non-EDCH (N), EDCH$_1$(N), and EDCH$_2$(N) to perform correlation demodulation, and calculates the receive power $P_{spread}$ for each MS after respreads(Step 9). Then, $P_{spread}$ for each MS is divided by corresponding SF to calculate a receive power of EDCH$_1$(N) or EDCH$_2$(N) for each MS (Step 10). Then, the BS 1 subtracts the calculated each receive power of EDCH$_1$(N) and EDCH$_2$(N) from each of the MSs from $P_{total}$ to thereby calculate the total receive power of only non-EDCH (N) (Step 11). In the step 11, each receive power of EDCH$_1$(N) and EDCH$_2$(N) can be, summed up to obtain receive power of EDCH, and then the total receive power of non-EDCH by subtracting the total receive power of EDCH from $P_{total}$.

The BS 1 adds 1 to the FN (Step 7), and repeats the operations from Step 1 to Step 11 of FIG. 10 until the FN becomes N+k (k is the number of frames transmitted by the BS 1, and is an integer not smaller than 1) (Step 8).

As described above, in this embodiment, the BS 1 measures the total receive power of frames of an MS, and calculates each EDCH receive power of an MS based on the measured total receive power. Then, the BS 1 subtracts the total of EDCH receive power for each mobile station from the total receive power to thereby obtain a total non-EDCH receive power of frames transmitted not over an EDCH. Thus, a total non-EDCH receive power is calculated. Accordingly, there is an effect that the total non-EDCH receive power of an uplink of an MS can be calculated by a BS without setting the transmission prohibition period of an EDCH in the BS and the MS in the radio cell of the BS.

In the above first to forth exemplary embodiments, it has assumed that one BS was managing one cell. However, there is a case where one BS manages a plurality of cells by using different frequency bands or by forming sectors by directional antennas, and the present invention can be applied for such a case by distinguishing each cell by the frequency band and the sector. In such a case, an optimum and precise control for each cell becomes possible by using the total non-EDCH receive power of signals obtained by the present invention and it results the effect of the present invention to enlarge.

While this invention has been described in connection with certain exemplary embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A method of measuring a receive power of uplink signals of a CDMA mobile communication system, comprising:
    measuring a first receive power of uplink signals, at at least one base station, transmitted from each of one or more mobile stations located in a cell;
    measuring each second receive power of an uplink signal including a frame only over a first channel, at the at least one base station, transmitted from each of said one or more mobile stations located in the cell; and
    calculating a total receive power of uplink signals excluding frames over the first channel by subtracting each second receive power measured in the second measuring step from the first receive power measured in the first measuring step.

2. A method of measuring a receive power of uplink signals of a CDMA mobile communication system, comprising:

receiving first uplink signals and measuring a first receive power of the first uplink signals, at at least one base station, transmitted from each of one or more mobile stations located in the cell;

respreading the first uplink signals for separating each second uplink signal, which is corresponding to each of said one or more mobile stations, from the first uplink signals;

calculating each second receive power of an uplink signal including a frame only over a first channel based on the separated second uplink signal; and calculating a total receive power of uplink signals excluding frames over the first channel by subtracting each second receive power calculated in the third step from the first receive power measured in the first step.

3. The method of measuring a receive power of uplink signals of a CDMA mobile communication system according to claim 2, wherein the calculating step of the third step comprising, calculating each second receive power of an uplink signal by dividing the separated second uplink signal by a spreading factor used in the CDMA mobile communication system.

4. A CDMA mobile communication system, comprising:
one or more mobile stations communicating with a base station in a cell; and
a base station, which measures a first receive power of uplink signals transmitted from each of the one or more mobile stations located in the cell and each second receive power of uplink signal including a frame only over a first channel transmitted from each of the one or more mobile stations, and calculates a total receive power of uplink signals excluding frames over the first channel by subtracting each second receive power from the first receive power.

5. The CDMA mobile communication system according to claim 4, wherein,
the base station receives first uplink signals and measures a first receive power of the first uplink signals, transmitted from each of one or more mobile stations located in the cell, respreads the first uplink signals for separating each second uplink signal corresponding to each of said one or more mobile stations from the first uplink signals, calculates each second receive power of an uplink signal including a frame only over a first channel based on the separated second uplink signal, and calculates a total receive power of uplink signals excluding frames over the first channel by subtracting each second receive power from the first receive power.

6. A base station for a CDMA mobile communication system, comprising:
a receive power measuring unit, which measures a first receive power of uplink signals transmitted from one or more mobile stations located in a cell, and measures each second receive power of an uplink signal including a frame only over a first channel transmitted from one or more mobile stations; and
a receive power calculating unit, which calculates a total receive power of uplink signals excluding frames over the first channel by subtracting each second receive power from the first receive power.

7. A base station for a CDMA mobile communication system, comprising:
a receive power measuring unit, which receives first uplink signals and measuring a first receive power of the first uplink signals transmitted from each of one or more mobile stations located in a cell;
a signal respreading unit, which respreads the first uplink signals for separating each second uplink signal, which is corresponding to each of said one or more mobile stations, from the first uplink signals;
a first calculating unit, which calculates each second receive power of an uplink signal including a frame only over a first channel based on the separated second uplink signal; and
a second calculating unit, which calculates a total receive power of uplink signals excluding frames over the first channel by subtracting each second receive power calculated in the first calculating unit from the first receive power measured in the receive power measuring unit.

8. The base station for a CDMA mobile communication system according to claim 7, wherein, each second receive power of an uplink signal including a frame only over a first channel is calculated by dividing the separated second uplink signal by a spreading factor used in the CDMA mobile communication system.

* * * * *